United States Patent
Ding et al.

(10) Patent No.: US 9,927,668 B2
(45) Date of Patent: Mar. 27, 2018

(54) ARRAY SUBSTRATE, DISPLAY PANEL, AND DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Hong Ding, Shanghai (CN); Lingxiao Du, Shanghai (CN); Kang Yang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 1 day.

(21) Appl. No.: 15/215,111

(22) Filed: Jul. 20, 2016

(65) Prior Publication Data

US 2017/0329173 A1    Nov. 16, 2017

(30) Foreign Application Priority Data

May 16, 2016    (CN) .......................... 2016 1 0322117

(51) Int. Cl.
*G02F 1/1335*    (2006.01)
*G02F 1/1345*    (2006.01)
(Continued)

(52) U.S. Cl.
CPC ........ *G02F 1/13458* (2013.01); *G02F 1/1368* (2013.01); *G02F 1/133512* (2013.01);
(Continued)

(58) Field of Classification Search
CPC ........... G02F 1/13458; G02F 1/133512; G02F 1/133514; G02F 1/1368; G02F 2201/121; G02F 2201/123; G02F 1/136213; G02F 2001/134318; G02F 2001/134372; G06F 3/0412; H01L 29/78633
See application file for complete search history.

(56) References Cited

U.S. PATENT DOCUMENTS

2009/0090911 A1*   4/2009  Choi ................. G02F 1/133512
                                                              257/59
2013/0300968 A1   11/2013  Okajima et al.
(Continued)

FOREIGN PATENT DOCUMENTS

CN          104698709 A      6/2015

*Primary Examiner* — Nathanael R Briggs
(74) *Attorney, Agent, or Firm* — Anova Law Group, PLLC

(57) ABSTRACT

The present disclosure provides an array substrate. The array substrate includes a plurality of thin film transistors configured in an array arrangement, a plurality of common electrodes, a plurality of mutually insulated pixel electrodes coupled to the common electrodes, and a plurality of metal pads coupled to the common electrodes and configured in a layer different from the common electrodes or the pixel electrodes. The metal pads are electrically connected to drain electrodes of the thin film transistors and pixel electrodes. An orthogonal projection of a metal pad on the array substrate overlaps with at least a portion of an orthogonal projection of a corresponding common electrode on the array substrate.

16 Claims, 11 Drawing Sheets

(51) Int. Cl.
  *G06F 3/041*   (2006.01)
  *G02F 1/1368*  (2006.01)
  *G02F 1/1362*  (2006.01)
  *G02F 1/1343*  (2006.01)

(52) U.S. Cl.
  CPC .. *G02F 1/133514* (2013.01); *G02F 1/136286* (2013.01); *G06F 3/0412* (2013.01); *G02F 2001/134372* (2013.01); *G02F 2201/121* (2013.01); *G02F 2201/123* (2013.01)

(56) References Cited

U.S. PATENT DOCUMENTS

| | | | |
|---|---|---|---|
| 2014/0054592 A1* | 2/2014 | Gu | G02F 1/134363 257/71 |
| 2014/0175445 A1 | 6/2014 | Tao et al. | |
| 2015/0055038 A1* | 2/2015 | Nagami | G02F 1/134309 349/39 |
| 2015/0098051 A1* | 4/2015 | Matsumoto | G02F 1/133734 349/125 |
| 2016/0247825 A1* | 8/2016 | Katsuta | H01L 27/1222 |
| 2017/0045984 A1* | 2/2017 | Lu | G06F 3/041 |

* cited by examiner

ARRAY SUBSTRATE, DISPLAY PANEL, AND DISPLAY DEVICE

CROSS-REFERENCES TO RELATED APPLICATIONS

This application claims the priority of Chinese Patent Application No. CN201610322117.0, filed on May 16, 2016, the entire contents of which are incorporated herein by reference.

FIELD OF THE DISCLOSURE

The present disclosure generally relates to the liquid crystal display technology and, more particularly, relates to an array substrate, a display panel incorporating the array substrate, and a display device incorporating the display panel.

BACKGROUND

With advances in display technologies, the liquid crystal display resolutions have been increasing consistently, and liquid crystal display panels are getting more and more widely used.

A liquid crystal display panel may include a plurality of pixels in the display region. Each pixel may include a pixel electrode, a thin film transistor connecting to the pixel electrode, and a common electrode. The pixel electrode and the common electrode are two electrodes of a pixel storage capacitor. The electric charge a storage capacitor can store is proportional to the areas of the two electrodes and inversely proportional to the distance between the two electrodes.

However, with the increasing resolution of display panels driven by the market demand, the size of pixels is decreasing. To avoid impacting the aperture, electrode areas of pixel storage capacitors are often reduced, causing reduction in pixel storage capacitance.

The disclosed array substrate, display panel and display device are directed to solve one or more problems in the art.

BRIEF SUMMARY OF THE DISCLOSURE

Directed to solve one or more problems set forth above and other problems in the art, the present disclosure provides an array substrate, a display panel and a display device.

One aspect of the present disclosure includes an array substrate. The array substrate includes a plurality of thin film transistors configured in an array arrangement, a plurality of common electrodes, a plurality of mutually insulated pixel electrodes coupled to the common electrodes, and a plurality of metal pads coupled to the common electrodes and configured in a layer different from the common electrodes or the pixel electrodes. The metal pads are electrically connected to drain electrodes of the thin film transistors and pixel electrodes. An orthogonal projection of a metal pad on the array substrate overlaps with at least a portion of an orthogonal projection of a corresponding common electrode on the array substrate.

Another aspect of the present disclosure includes a display panel. The display panel includes a disclosed array substrate, a color filter substrate configured facing toward the array substrate, and a display functional layer configured between the array substrate and the color filter substrate.

Another aspect of the present disclosure includes a display device. The display device includes the disclosed display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
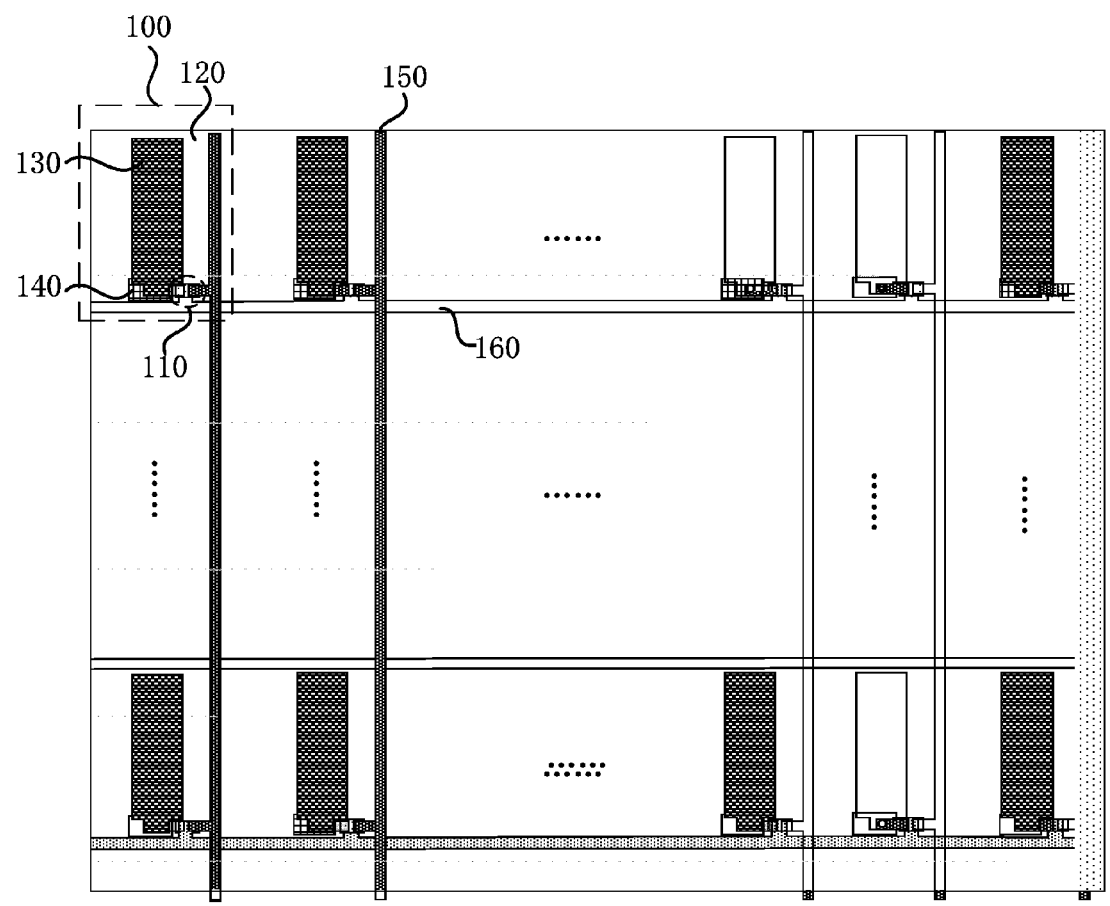
FIG. 1 illustrates a perspective view of an exemplary array substrate according to the disclosed embodiments.
Figure 2:
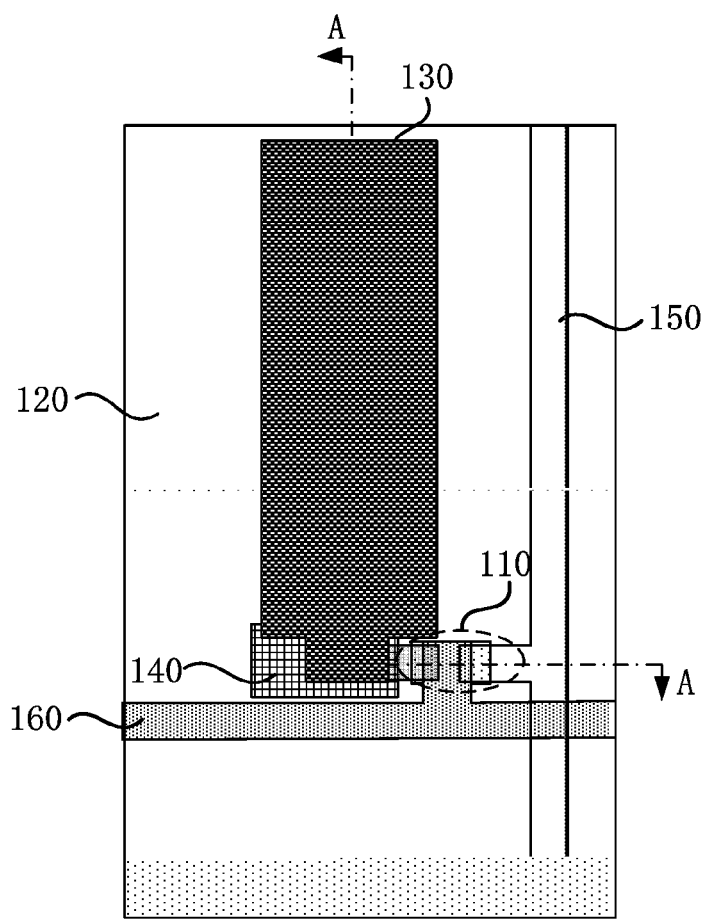
FIG. 2 illustrates a partial perspective view of an exemplary array substrate according to the disclosed embodiments.
Figure 3:
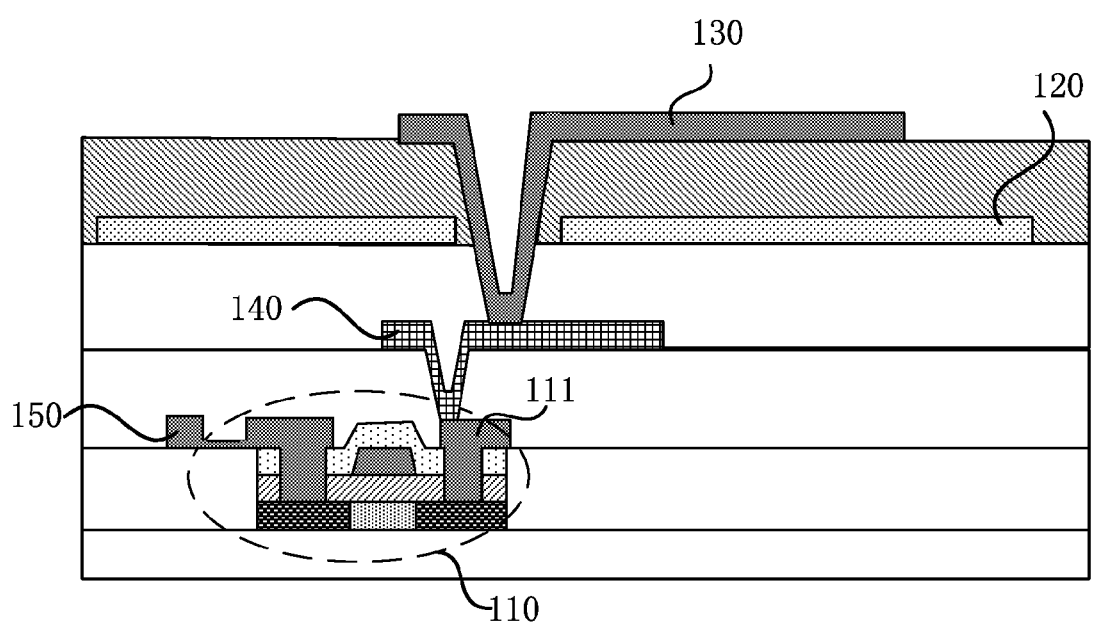
FIG. 3 illustrates a cross-sectional view of the array substrate in FIG. 2 along the A-A direction.

FIG. 1 illustrates a perspective view of an exemplary array substrate according to the present disclosure. FIG. 2 illustrates a partial perspective view of an exemplary array substrate according to the present disclosure, i.e., an enlarged view of a dashed box region 100 of FIG. 1. FIG. 3 illustrates a cross-sectional view of the array substrate in FIG. 2 along the A-A direction.

Referring to FIGS. 1-2, the array substrate may include a plurality of thin film transistors (TFTs) 110 arranged in an array, a plurality of common electrodes 120, a plurality of mutually insulated pixel electrodes 130, and a plurality of metal pads 140.

The metal pads may be configured in a different layer with the common electrodes 120 or the pixel electrodes 130. Further, referring to FIG. 3, the metal pads 140 may be electrically connected to a drain electrode 111 of the thin film transistor 110 and the pixel electrode 130.

Further, referring to FIG. 1, the array substrate may also include a plurality of data lines 150 and a plurality of scanning lines 160. Adjacent data lines 150 and adjacent scanning lines 160 may intersect with each other and define a pixel. Each data line 150 may be electrically connected to source electrodes of a same column of thin film transistors 110. Each scanning line 160 may be electrically connected to gate electrodes of a same row of thin film transistors.

By supplying scanning signals to scanning lines 160, the thin film transistors 110 connected by a same scanning line 160 may be turned on. Data voltages may be supplied to data lines 150 to charge pixel electrodes 130 through the thin film transistors 110 in the conductive state to form electric fields between the corresponding pixel electrodes 130 and the common electrodes 120. The electric fields may drive liquid crystals to rotate to achieve image display by pixels. At the same time, the overlapped portions of the pixel electrodes 130 and the common electrodes 120 may form pixel storage capacitors. Referring to FIG. 2, the metal pad 140 may have an orthogonal projection on the array substrate overlap with at least a portion of an orthogonal projection of the common electrode 120 on the array substrate.

In one embodiment, in a pixel, the pixel electrode 130 and the metal mad 140 may be electrically connected so that the pixel electrode 130 and the metal pad 140 may have a same voltage. Because the orthogonal projection of the metal pad 140 on the array substrate may overlap with at least a portion of the orthogonal projection of the common electrode 120 on the array substrate, the effective area of the electrode facing toward the common electrode 120 in a single pixel storage capacitor may be increased. Thus, the capacitance of a single pixel storage capacitor may be increased.

Specifically, after charging of a pixel electrode 130 is completed, the thin film transistor 110 may be turned off. The electric charge stored in the storage capacitor between the pixel electrode 130 and the common electrode 120 may decrease. When the storage capacitors do not have sufficient capacitance, the image displayed by the pixels may not be maintained long enough until the image is refreshed in the next display cycle. As a result, the displayed image may be flickering.

The array substrate according to the present disclosure may increase the storage capacitance for each individual pixel so that each individual pixel may maintain the displayed image long enough until the image gets refreshed in the next cycle. The disclosed array substrate may minimize the image flickering issue in high PPI (pixels per inch) or high resolution display panels, improving the image display quality.

The array substrate according to the present disclosure does not limit the shape and the area of the metal pads 140. In one embodiment, as shown in FIG. 2, the metal pad 140 may be a rectangular-shaped structure, and may be located surrounding a through-hole connecting the pixel electrode 130 and the thin film transistor 110. In other embodiments, the metal pads 140 may be in other shape, which may have even larger areas.

Figure 4:
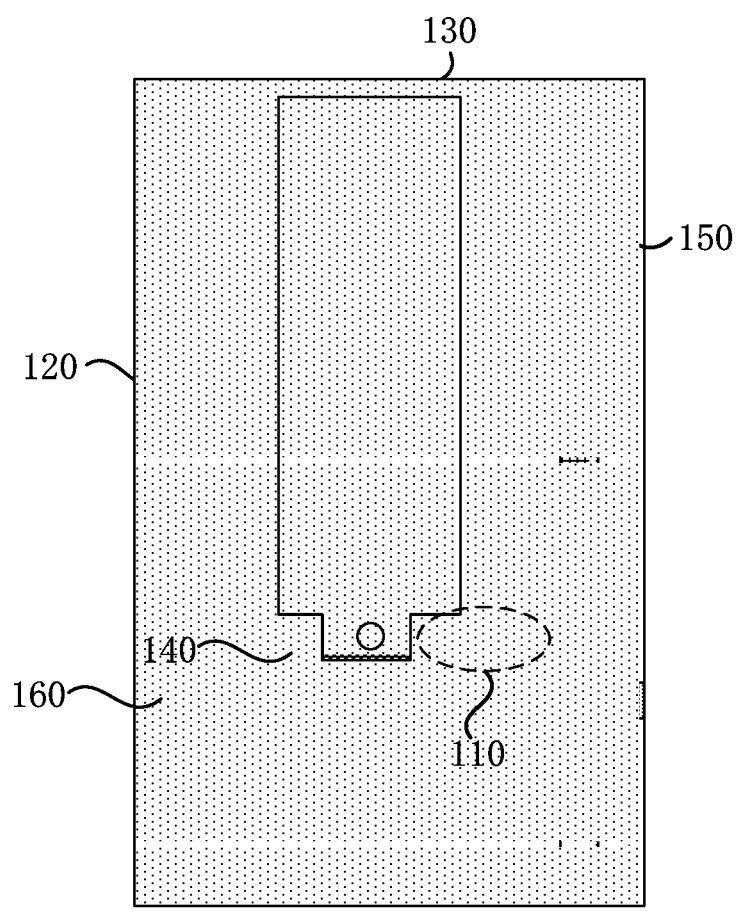
FIG. 4 illustrates a partial perspective view of another exemplary array substrate according to the disclosed embodiments.

FIG. 4 illustrates a partial perspective view of another exemplary array substrate according to the present disclosure. Referring to FIG. 4, the array substrate may include a plurality of data lines 150. Different from the array substrate in FIG. 2, in addition to being configured surrounding the through-hole connecting the pixel electrode 130 and the thin film transistor 110, the array substrate may be extended further and have an orthogonal projection on the array substrate overlap with a portion of the orthogonal projection of the data line 150 on the array substrate. Further, the overlapped portion between the orthogonal projection of the metal pad 140 on the array substrate and the orthogonal projection of the data line 150 on the array substrate may overlap with a portion of the orthogonal projection of the common electrode 120 on the array substrate.

In one embodiment, in order to further increase the overlapping area between the metal pad 140 and the common electrode 120, the metal pad 140 may be configured in such a way that the orthogonal projection of the metal pad 140 on the array substrate overlaps with a portion of the orthogonal projection of the data line 150 on the array substrate. Thus, the area of the electrode facing toward the common electrode 120 in the storage capacitor of each individual pixel may be increased, and the capacitance of the storage capacitor in each individual pixel may be increased to minimize flickering in high PPI or high resolution displays and to improve the image display quality.

Further, referring to FIG. 4, the orthogonal projection of the metal pad 140 on the array substrate may overlap with the orthogonal projection of the thin film transistor 110 on the array substrate to further increase the overlapping area between the metal mad 140 and the common electrode 120 and to further increase the capacitance of the storage capacitor in each individual pixel.

Figure 5:
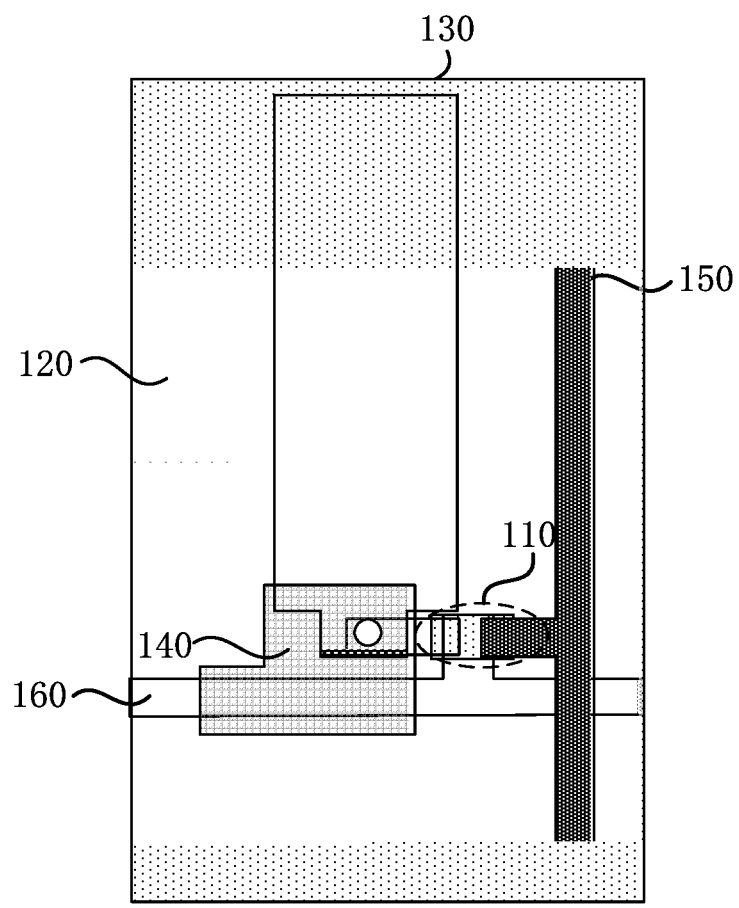
FIG. 5 illustrates a partial perspective view of another exemplary array substrate according to the disclosed embodiments.

FIG. 5 illustrates a partial perspective view of another exemplary array substrate according to the present disclosure. Further, referring to FIG. 5, the array substrate may include a plurality of scanning lines 160. The orthogonal projection of the metal pad 140 on the array substrate may overlap with a portion of the orthogonal projection of the scanning line 160 on the array substrate. In addition, the overlapping portion between the metal pad 140 and the scanning line 160 may overlap with a portion of the orthogonal projection of the common electrode 120 on the array substrate.

In one embodiment, in order to further increase the overlapping area between the metal pad 140 and the common electrode 120, the metal pad 140 may be configured in such a way that the orthogonal projection of the metal pad 140 on the array substrate overlaps with a portion of the orthogonal projection of the scanning line 160 on the array substrate. Thus, the area of the electrode facing toward the common electrode 120 in the storage capacitor of each individual pixel may be increased, and the capacitance of the storage capacitor in each individual pixel may be increased to minimize flickering in high PPI or high resolution displays and to improve the image display quality.

Figure 6:
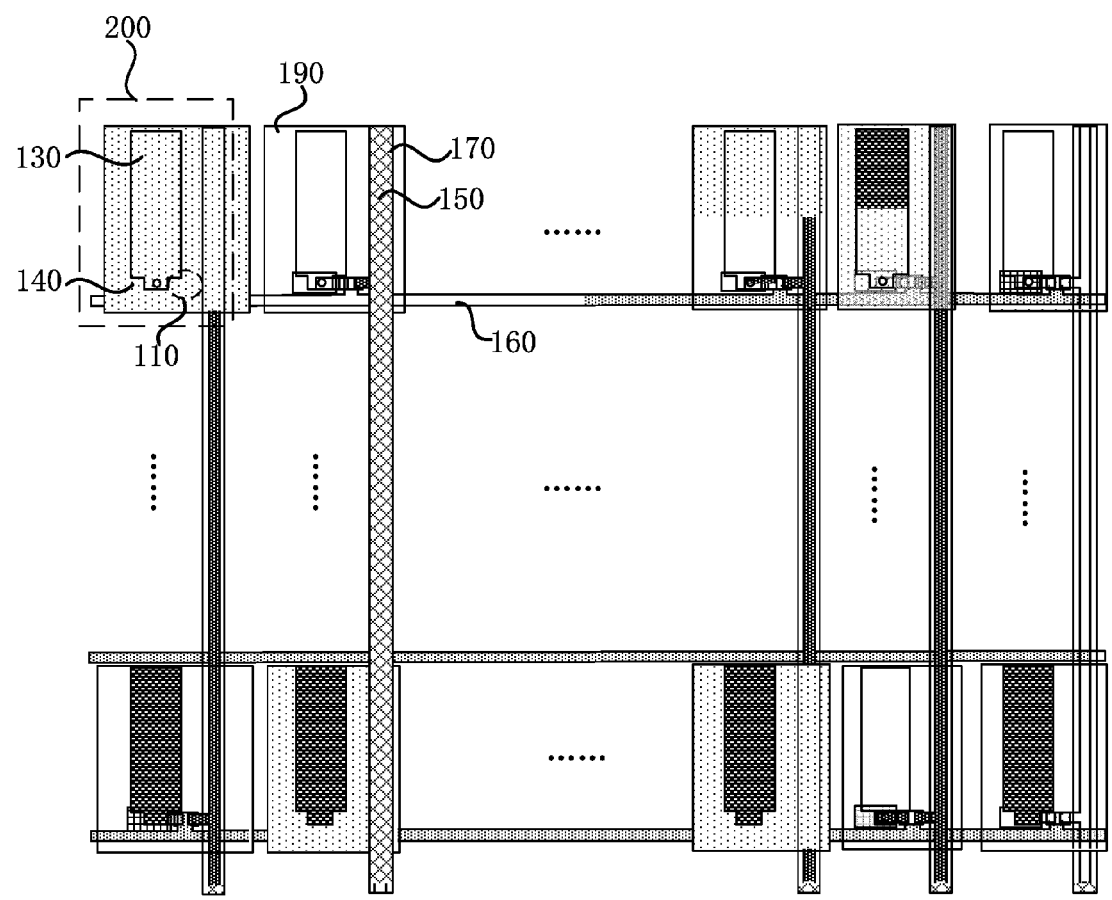
FIG. 6 illustrates a perspective view of an exemplary array substrate having touch control leads according to the disclosed embodiments.

FIG. 6 illustrates a perspective view of an exemplary array substrate having touch control leads according to the present disclosure. Referring to FIG. 6, the array substrate may include a plurality of touch control electrodes 190 and a plurality of touch control signal leads 170. In one embodiment, each touch control electrode 190 may be connected to at least one corresponding touch control signal lead 170.

In one embodiment, the metal pads 140 may be configured in a same layer with the plurality of the touch control signal lead 170. In another embodiment, the metal pads 140 may be configured in a layer different from the plurality of the touch control signal lead 170.

Figure 7:
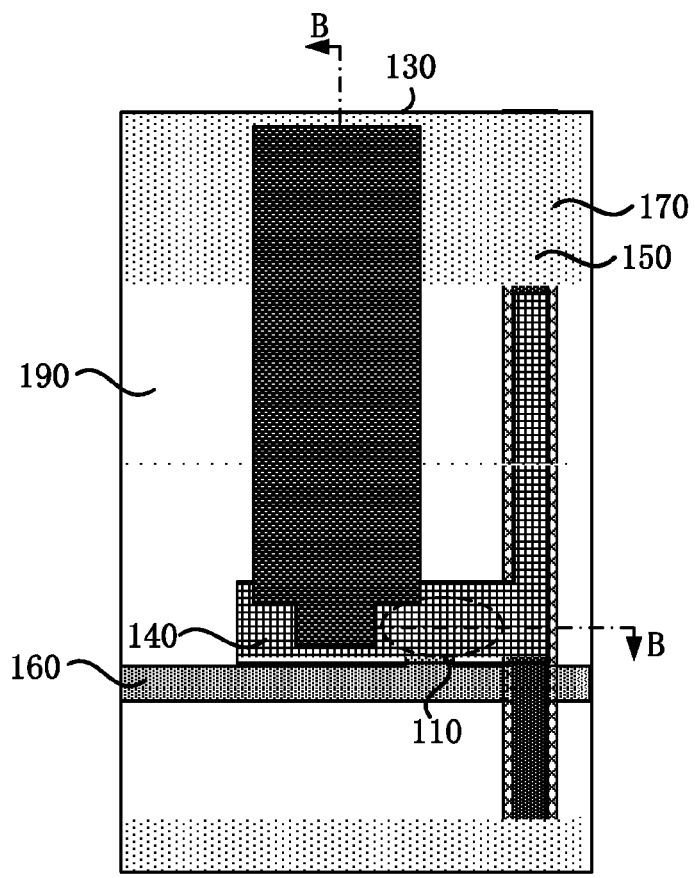
FIG. 7 illustrates a partial perspective view of an exemplary array substrate having touch control leads according to the disclosed embodiments.
Figure 8:
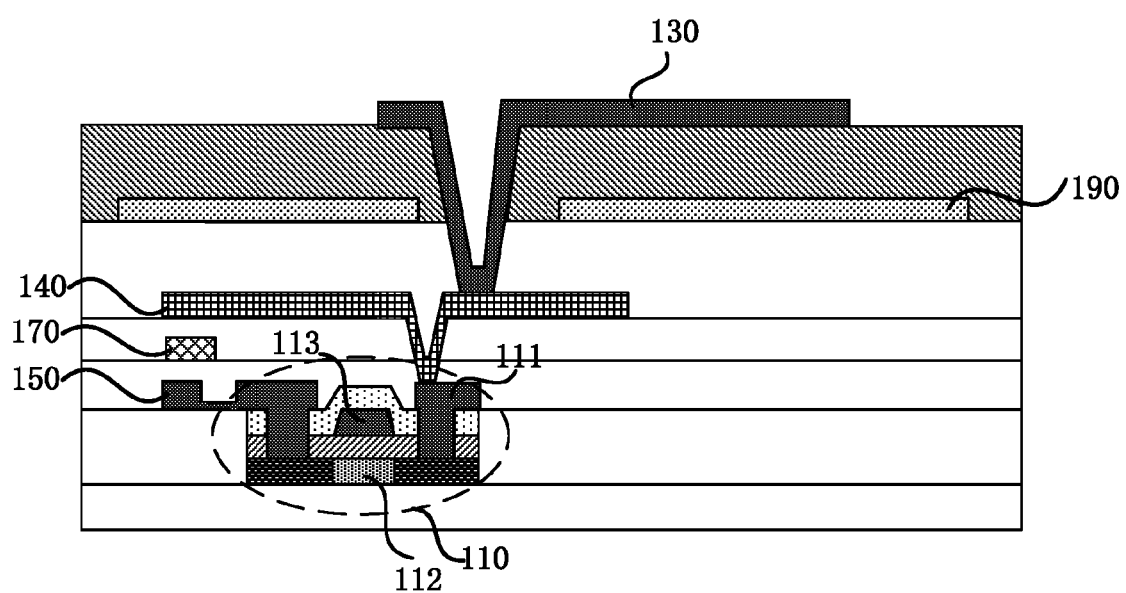
FIG. 8 illustrates a cross-sectional view of the array substrate in FIG. 7 along the B-B direction.

FIG. 7 illustrates a partial perspective view of an exemplary array substrate having touch control leads according to the present disclosure. FIG. 7 may be a partial enlarged view of the dashed box region 200 in FIG. 6. FIG. 8 illustrates a cross-sectional view of the array substrate in FIG. 7 along the section B-B.

Referring to FIGS. 7-8, in one embodiment, when the metal pad 140 is configured in a layer different from the touch control signal lead 170 in the touch control display panel where the touch control electrodes 190 and the touch control signal leads 170 are located inside the display panel (in-cell), the orthogonal projection of the metal pad 140 on the array substrate may partially overlap with the orthogonal projections of the data line 150 and the thin film transistor 110 on the array substrate to ensure the metal pad 140 has a larger coverage area and each individual pixel has a larger storage capacitance.

Figure 9:
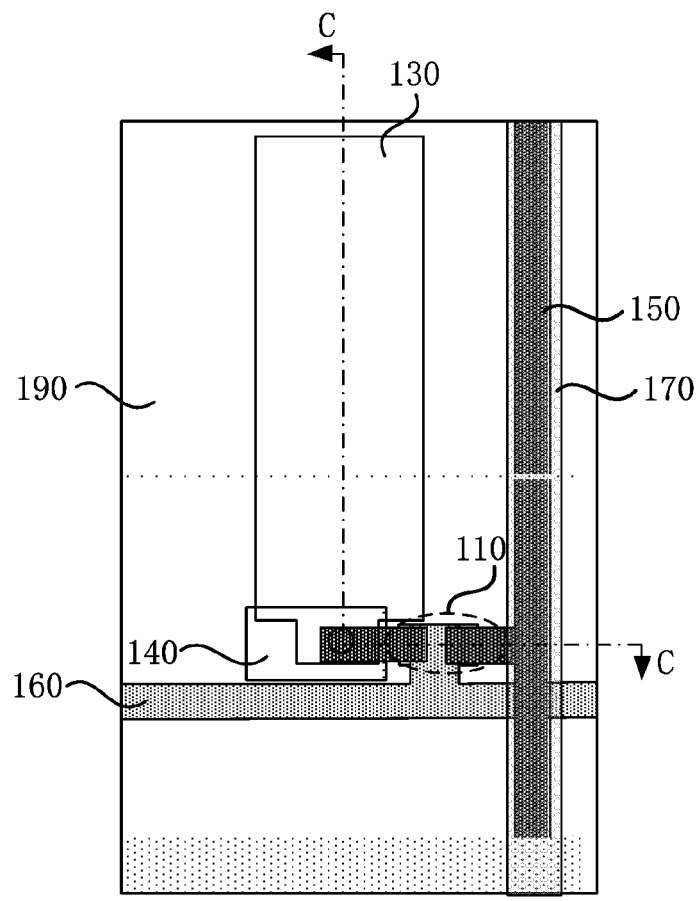
FIG. 9 illustrates a partial perspective view of another exemplary array substrate having touch control leads according to the disclosed embodiments.
Figure 10:
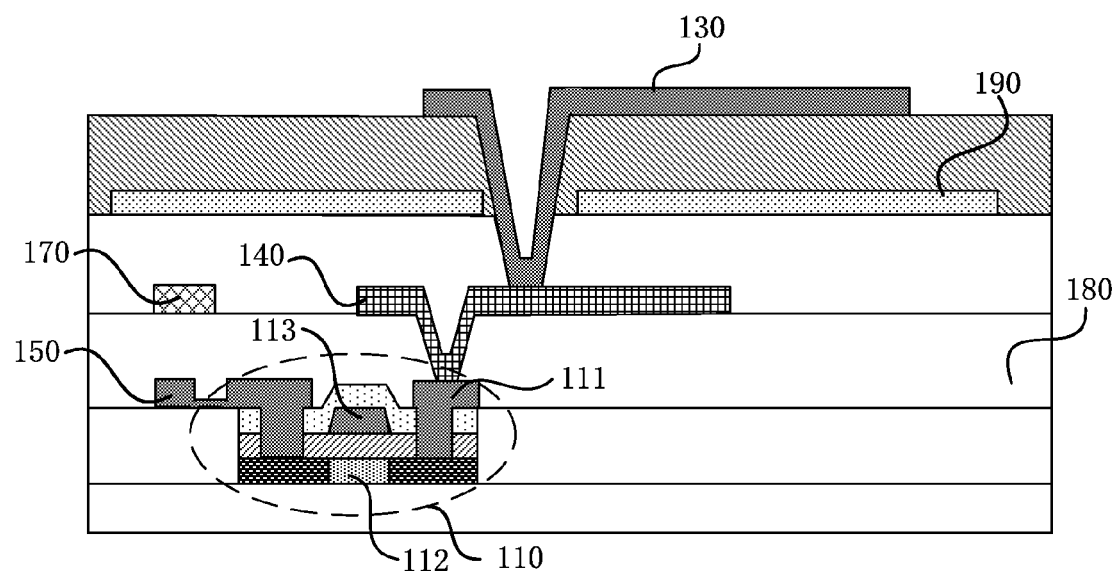
FIG. 10 illustrates a cross-sectional view of the array substrate in FIG. 9 along the C-C direction.

FIG. 9 illustrates a partial perspective view of another exemplary array substrate having touch control leads according to the present disclosure. FIG. 10 illustrates a cross-sectional view of the array substrate in FIG. 9 along the C-C direction. Referring to FIGS. 9-10, in one embodiment, when the metal pad 140 is configured in a same layer with the touch control signal lead 170, the metal pad 140 and the touch control signal lead 170 may be formed with a same material in a same step of the fabrication process such that fabrication cost may be saved, the fabrication process may be streamlined, and production yield may be improved.

In one embodiment, each touch control electrode may be electrically connected to one corresponding touch control signal lead. In other embodiments, each touch control electrode may be electrically connected to a plurality of touch control signal leads to prevent any malfunction caused by breakage of single touch control signal lead.

Further, the touch control electrodes may be configured solely as electrodes for touch control or may be multiplexed as touch control electrodes for touch control and common electrodes for display. As shown in FIGS. 6-10, the array substrate may have electrodes multiplexed for touch control electrodes and common electrodes.

When the touch control display panel operates in display mode, the common electrodes may supply common voltage. When the touch control display panel operates in touch control mode, the common electrodes may act as touch control electrodes to supply touch control driving signals. Multiplexing touch control electrodes and common electrodes may reduce thickness of touch control display panels. Multiplexed touch control electrodes and common electrodes may be formed in a single etching of the fabrication process without separate masks for touch control electrodes and common electrodes. Thus, fabrication cost may be saved, number of etching steps in the fabrication process may be reduced, and production yield may be improved.

Further, referring to FIG. 10, the active layer 112 of the thin film transistor 110 may be made of polysilicon or amorphous silicon. Specifically, amorphous silicon may have smaller mobility than polysilicon. Amorphous silicon thin film transistor may occupy more space to fabricate than polysilicon thin film transistor. Thus, amorphous silicon may be less likely to be used to make high PPI or high resolution displays.

In one embodiment, a metal pad 140 may be added in each pixel of amorphous silicon display product to increase the area of the electrode facing toward the common electrode 120. The increased electrode area may increase the storage capacitance in each individual pixel of amorphous silicon display product. The increased storage capacitance may increase the PPI or resolution of amorphous silicon display product, and may improve the image display quality.

In another embodiment, a metal pad 140 may be added in each pixel of polysilicon display product to increase the area of the electrode facing toward the common electrode 120. The increased electrode area may increase the storage capacitance in each individual pixel of polysilicon display product. The increased storage capacitance may minimize flickering due to leakage current.

Further, referring to FIG. 10, the gate electrode 113 of the thin film transistor 110 may be located on the side of the active layer 112 facing toward to the pixel electrode 130. The array substrate may also include a planarization layer 180 formed on the thin film transistor 110. The metal pad 140 may be formed on the side of the planarization layer 180 facing away from the thin film transistor 110. Parasitic capacitance may form between the metal pad 140 and scanning line 160 and other metal layers. Forming the metal pad 140 on the planarization layer 180 may reduce parasitic capacitance, and may avoid significantly increasing the driving load of the scanning line 160 and other metal layers after the metal pad 140 is added.

In one embodiment, the gate electrode 113 of the thin film transistor 110 may be located on the side of the active layer 112 facing toward to the pixel electrode 130. In other embodiments, the thin film transistor may have different structures.

Figure 11:
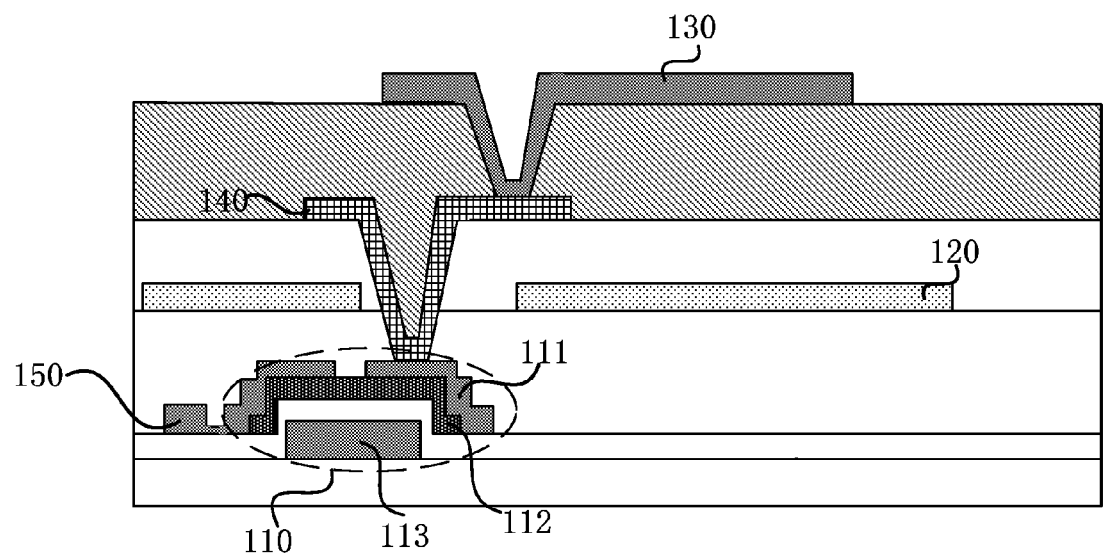
FIG. 11 illustrates a cross-sectional view of another exemplary array substrate according to the disclosed embodiments.

FIG. 11 illustrates a cross-sectional view of another exemplary array substrate according to the present disclosure. Referring to FIG. 11, the gate electrode 113 of the thin film transistor 110 may be located on the side of the active layer 112 facing away from the pixel electrode 130.

Further, in certain embodiments, as shown in FIGS. 1-10, the common electrode 120 layer may be located between the metal pad 140 layer and the pixel electrode 130 layer. In other embodiments, the array substrate may have different position relationship of electrode layers.

Figure 12:
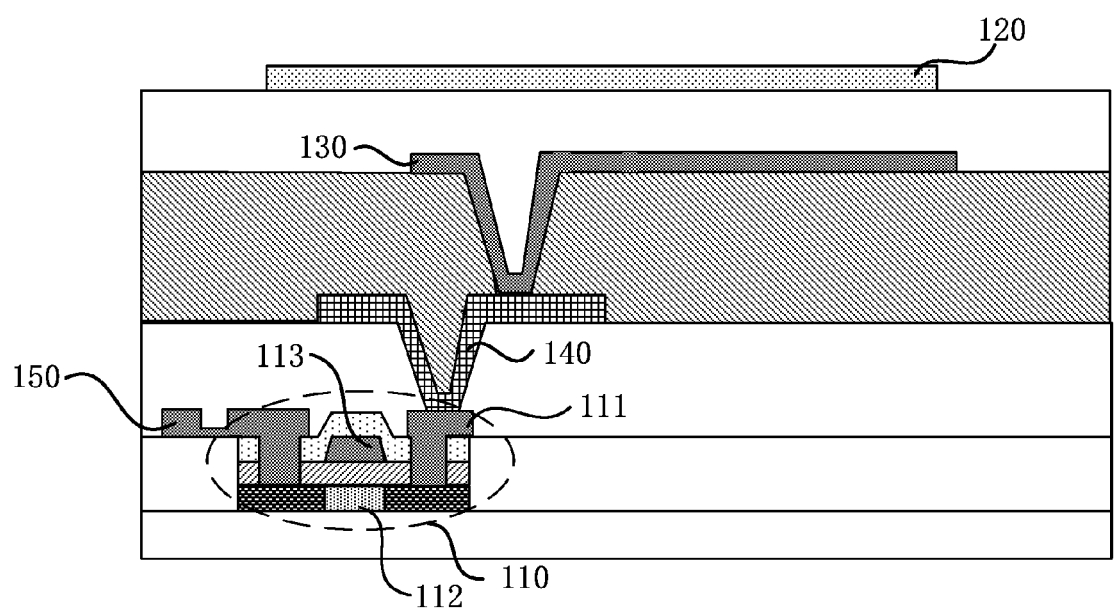
FIG. 12 illustrates a cross-sectional view of another exemplary array substrate showing layer position relationships according to the disclosed embodiments.

In one embodiment, referring to FIG. 11, the metal pad 140 layer may be located between the common electrode 120 layer and the pixel electrode 130 layer. FIG. 12 illustrates a cross-sectional view of another exemplary array substrate showing layer position relationship according to the present disclosure. In another embodiment, referring to FIG. 12, the pixel electrode 130 layer may be located between the common electrode 120 layer and the metal pad 140 layer.

Noted that the array substrates shown in FIGS. 1-12 may be similar. Whenever similar structures are present, such structures may be labeled the same. The similar structures sometimes are not described repeatedly.

Figure 13:
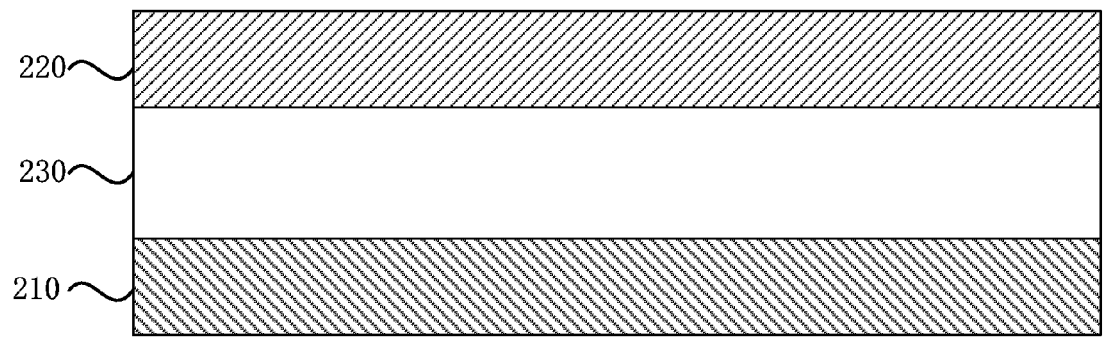
FIG. 13 illustrates a schematic view of an exemplary display panel according to the disclosed embodiments.

The present invention also provides a display panel. FIG. 13 illustrates a schematic view of an exemplary display panel according to the present disclosure. Referring to FIG. 13, the display panel may include a previously disclosed array substrate 210, a color filter substrate 220 configured facing toward to the array substrate, and a display functional layer 230 located between the array substrate 210 and the color filter substrate 220.

Figure 14:
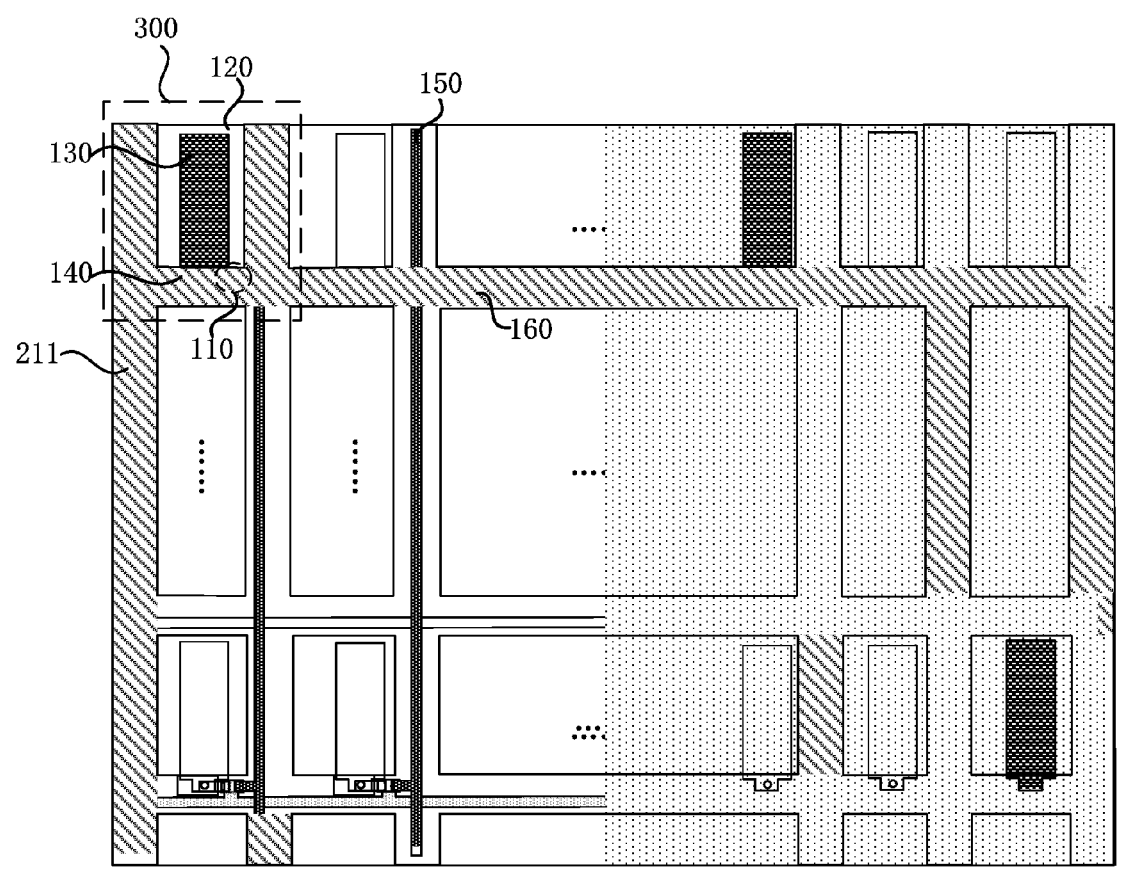
FIG. 14 illustrates a perspective view of an exemplary display panel according to the disclosed embodiments.
Figure 15:
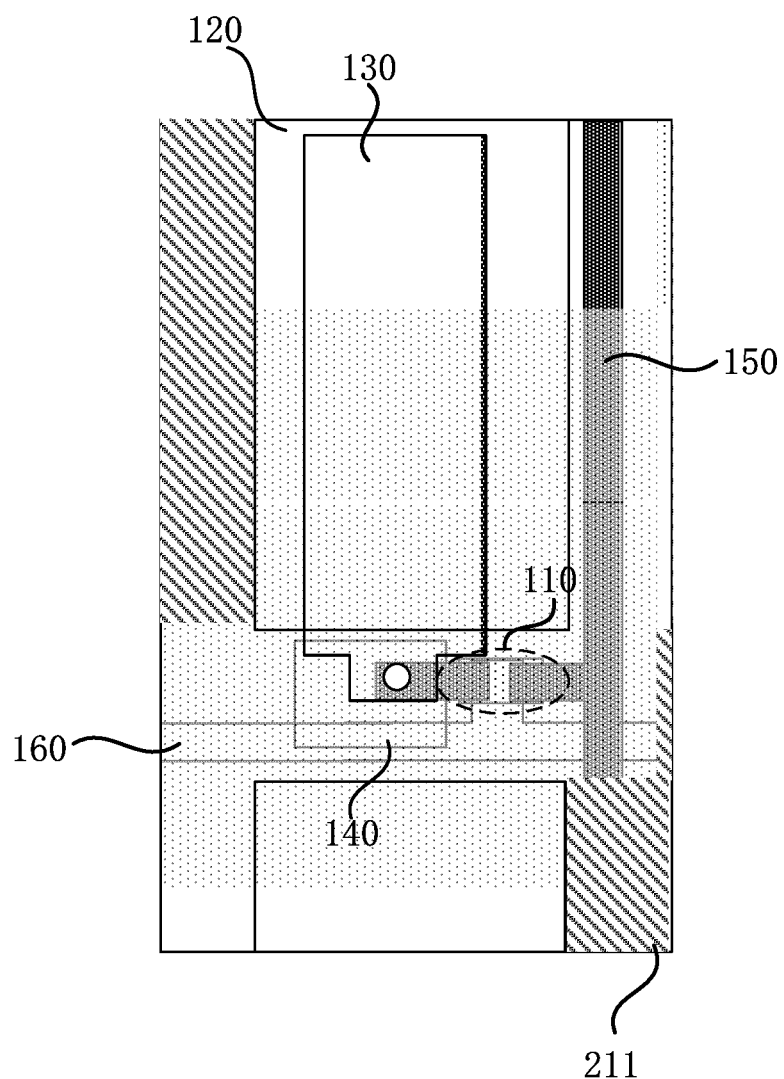
FIG. 15 illustrates a partial perspective view of an exemplary display panel according to the disclosed embodiments.

FIG. 14 illustrates a perspective view of an exemplary display panel according to the present disclosure. Referring to FIG. 14, the color filter substrate may be configured with a black matrix 211. FIG. 15 illustrates a partial perspective view of an exemplary display panel according to the present disclosure. FIG. 15 shows an enlarged view of the dashed box region 300 in FIG. 14.

Referring to FIGS. 14-15, the orthogonal projection of the metal pad 140 on the array substrate may be located inside the orthogonal projection of the black matrix 211 of the color filter substrate on the array substrate. Disposing the metal pad 140 inside the projection of the black matrix 211 may avoid the issue of metal pads 140 being visible, and may also ensure that the addition of the metal pads 140 does not subsequently affect pixel aperture.

By adding metal pads in the array substrate, the display panel according the present disclosure may increase the storage capacitance of each individual pixel to minimize the flickering of high PPI or high resolution displays and to improve image display quality.

Figure 16:
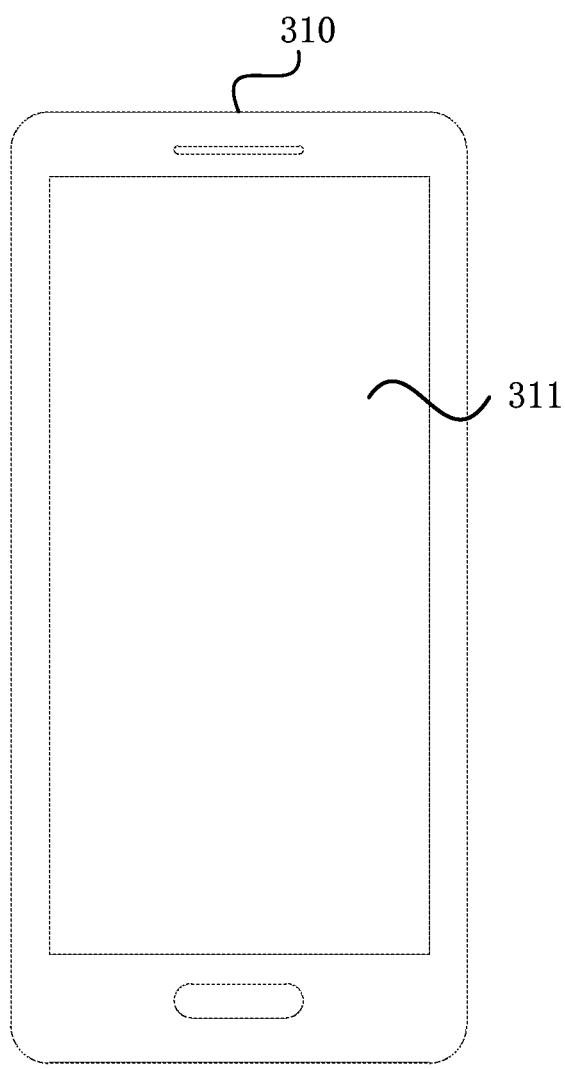
FIG. 16 illustrates a schematic view of an exemplary display device according to the disclosed embodiments.

The present invention also provides a display device. FIG. 16 illustrates a schematic view of an exemplary display device according to the present disclosure. Referring to FIG. 16, the display device 310 may include a previously disclosed display panel 311.

The display device according to the present disclosure may also include other circuits and components for supporting the operation of the display device. The display device may be one of cell phones, tablet computers, electronic paper, and electronic photo frames.

By adding metal pads in the array substrate, the display device according the present disclosure may increase the storage capacitance of each individual pixel to minimize the flickering of high PPI or high resolution displays and to improve image display quality.

Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An array substrate, comprising:
a plurality of thin film transistors configured in an array arrangement;
a plurality of scanning lines;
a plurality of common electrodes;
a plurality of mutually insulated pixel electrodes coupled to the common electrodes; and
a plurality of metal pads coupled to the common electrodes and configured in a layer different from the common electrodes or the pixel electrodes,
wherein:
the metal pads are electrically connected to drain electrodes of the thin film transistors and the pixel electrodes;
an orthogonal projection of a metal pad on the array substrate overlaps with at least a portion of an orthogonal projection of a corresponding common electrode on the array substrate;
the orthogonal projection of the metal pad on the array substrate overlaps with a portion of an orthogonal projection of a corresponding scanning line on the array substrate; and
the overlapped portion between the orthogonal projection of the metal pad on the array substrate and the orthogonal projection of the scanning line on the array substrate overlaps with a portion of the orthogonal projection of the corresponding common electrode on the array substrate.

2. The array substrate of claim 1, wherein:
the plurality of common electrodes are connected together to form a single plane of common electrode.

3. An array substrate, comprising:
a plurality of thin film transistors configured in an array arrangement
a plurality of data lines;
a plurality of common electrodes;
a plurality of mutually insulated pixel electrodes coupled to the common electrodes; and
a plurality of metal pads coupled to the common electrodes and configured in a layer different from the common electrodes or the pixel electrodes,
wherein:
the metal pads are electrically connected to drain electrodes of the thin film transistors and the pixel electrodes;
an orthogonal projection of a metal pad on the array substrate overlaps with at least a portion of an orthogonal projection of a corresponding common electrode on the array substrate;
the orthogonal projection of the metal pad on the array substrate overlaps with a portion of an orthogonal projection of a corresponding data line on the array substrate; and
the overlapped portion between the orthogonal projection of the metal pad on the array substrate and the orthogonal projection of the data line on the array substrate overlaps with a portion of an orthogonal projection of the corresponding common electrode on the array substrate.

4. The array substrate of claim 1, further including a plurality of touch control electrodes and touch control signal leads, wherein:
each touch control electrode is electrically connected to at least one corresponding touch control signal lead.

5. The array substrate of claim 4, wherein:
the touch control electrodes are multiplexed as the common electrodes.

6. The array substrate of claim 4, wherein:
the metal pads are configured in a same layer with the touch control signal leads.

7. The array substrate of claim 4, wherein:
the metal pads and the touch control signal leads are formed with a same material in a same step of a fabrication process.

8. The array substrate of claim 1, wherein:
an active layer of each thin film transistor is made of polysilicon or amorphous silicon.

9. The array substrate of claim 8, wherein:
a gate electrode of the thin film transistor is located on the side of the active layer of the thin film transistor facing toward the pixel electrode.

10. The array substrate of claim 1, further including a planarization layer configured to cover the thin film transistors, wherein:
the metal pads are configured on a side of the planarization layer facing away from the thin film transistors.

11. The array substrate of claim 1, wherein:
a common electrode layer is located between a metal pad layer and a pixel electrode layer.

12. The array substrate of claim 1, wherein:
the metal pad layer is located between the common electrode layer and the pixel electrode layer.

13. The array substrate of claim 1, wherein:
the pixel electrode layer is located between the common electrode layer and the metal pad layer.

14. A display panel, comprising:
an array substrate;
a color filter substrate configured facing toward the array substrate; and
a display functional layer configured between the array substrate and the color filter substrate, wherein the array substrate includes:
 a plurality of thin film transistors configured in an array arrangement;
 a plurality of scanning lines;
 a plurality of common electrodes;
 a plurality of mutually insulated pixel electrodes coupled to the common electrodes; and
 a plurality of metal pads coupled to the common electrodes and configured in a layer different from the common electrodes or the pixel electrodes, wherein:
  the metal pads are electrically connected to drain electrodes of the thin film transistors and the pixel electrodes, and are configured on a side of a planarization layer facing away from the thin film transistors;
  an orthogonal projection of a metal pad on the array substrate overlaps with at least a portion of an orthogonal projection of a corresponding common electrode on the array substrate;
  the orthogonal projection of the metal pad on the array substrate overlaps with a portion of an orthogonal projection of a corresponding scanning line on the array substrate; and
  the overlapped portion between the orthogonal projection of the metal pad on the array substrate and the orthogonal projection of the scanning line on the array substrate overlaps with a portion of the orthogonal projection of the corresponding common electrode on the array substrate.

15. The display panel of claim 14, wherein:
a black matrix is configured on the color filter substrate; and
orthogonal projections of the metal pads on the array substrate are located inside an orthogonal projection of the black matrix of the color filter substrate on the array substrate.

16. A display device, comprising a display panel of claim 14.

* * * * *